US 8,620,525 B2

(12) United States Patent
Araki et al.

(10) Patent No.: US 8,620,525 B2
(45) Date of Patent: Dec. 31, 2013

(54) POSTURE CONTROL DEVICE OF MOTORCYCLE AND MOTORCYCLE

(75) Inventors: Makoto Araki, Wako (JP); Hiroyoshi Kobayashi, Wako (JP); Tsuyoshi Tsuda, Wako (JP); Tsubasa Nose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 13/240,066

(22) Filed: Sep. 22, 2011

(65) Prior Publication Data

US 2012/0083973 A1   Apr. 5, 2012

(30) Foreign Application Priority Data

Sep. 30, 2010   (JP) ................. 2010-221414

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |

(52) U.S. Cl.
USPC ................ 701/41; 180/219; 180/282

(58) Field of Classification Search
USPC ........ 701/1, 124, 22, 31.4, 36, 37, 38, 42, 43, 701/45, 48, 49, 530, 69, 70, 71, 72, 75, 41, 701/423, 469; 180/210, 219, 223, 402, 415, 180/422; 280/124.1, 271, 279, 283, 5.502, 280/5.507; 33/356, 366.16; 362/465, 473; 434/61; 700/279; 60/299; 73/11.07, 73/117.03, 504.12, 504.16
See application file for complete search history.

(56) References Cited

U.S. PATENT DOCUMENTS

| | | | | |
|---|---|---|---|---|
| 7,814,793 | B2* | 10/2010 | Sato ........................... | 73/504.12 |
| 2006/0041367 | A1* | 2/2006 | Ono et al. ..................... | 701/75 |
| 2007/0102217 | A1* | 5/2007 | Kimura ......................... | 180/223 |
| 2009/0024293 | A1* | 1/2009 | Takenaka et al. .............. | 701/71 |

FOREIGN PATENT DOCUMENTS

JP        2007-125917          5/2007

* cited by examiner

*Primary Examiner* — Thomas Black
*Assistant Examiner* — Isaac Smith
(74) *Attorney, Agent, or Firm* — Squire Sanders (US) LLP

(57) ABSTRACT

A system for performing posture control of a motorcycle is such that in outputting a synthesized output by adjusting a yaw direction output and a roll direction output outputted from a displacement detection sensor by an adjustment part respectively, a synthesized output in which the yaw direction output is larger than the roll direction output is outputted when a vehicle speed is low, and a synthesized output in which the roll direction output is larger than the yaw direction output is outputted when the vehicle speed is high. Accordingly, in either a case where the vehicle is traveling at a low speed or a case where the vehicle is traveling at a high speed, the displacement and the behavior of a motorcycle 10 can be detected with high accuracy thus eventually realizing a control of the posture of the motorcycle 10 with high accuracy.

17 Claims, 17 Drawing Sheets

POSTURE CONTROL DEVICE OF MOTORCYCLE AND MOTORCYCLE

BACKGROUND

1. Field:

The present invention relates to a posture control device of a motorcycle which detects a posture of a traveling motorcycle by a displacement detection sensor and controls the posture of the motorcycle based on a detection result. The invention also relates to a motorcycle employing the same.

2. Description of the Related Art

Conventionally, there has been proposed a control system which controls a posture of a traveling motorcycle In patent document 1 (Japanese Patent Publication JP-A-2007-125917), there is the description that lowering of turning performance of a motorcycle during turning can be prevented by setting an inclination angle of a rear wheel corresponding to an output of a roll rate sensor (roll angular velocity sensor) and a vehicle speed.

SUMMARY

In turning a motorcycle, in general, a motorcycle is turned by rolling a vehicle body. At a low speed, however, there is observed a strong tendency that a rider turns the motorcycle by steering a handle thus imparting a steering angle, while at a high speed, there is observed a strong tendency that the rider rolls the vehicle body by shifting his weight in the turning direction and turns the motorcycle with a steering angle of steering accompanying the rolling.

Accordingly, in a system where an assist force is added to a manipulation by a rider using an actuator such as a motor for steering a vehicle, there has been a drawback that it is difficult to impart a proper assist force corresponding to the difference in manipulation by the rider at a low speed and a high speed merely based on a sensor output in the roll direction used in the related art.

The present invention has been made under such circumstances, and it is an object of the present invention to provide a posture control device of a motorcycle which can perform a posture control of a motorcycle from a very low speed to a high speed with high accuracy.

Means for Solving the Problem

A posture control device of a motorcycle according to one embodiment of the invention is directed to a posture control device of a motorcycle provided with a posture control system which controls a posture of a motorcycle by detecting the posture of the motorcycle and by controlling a steering unit of the motorcycle based on a detection result. The posture control system comprises a vehicle speed sensor which detects a vehicle speed of the motorcycle. A displacement detection sensor detects displacement of the motorcycle in a yaw direction and displacement of the motorcycle in a roll direction, and outputs a yaw direction output and a roll direction output. An adjustment part outputs a synthesized output by adjusting the yaw direction output and the roll direction output of the displacement detection sensor corresponding to the detected vehicle speed. An actuator controls the posture of the motorcycle based on the synthesized output. The adjustment part outputs the synthesized output in which the yaw direction output is larger than the roll direction output with respect to the yaw direction output and the roll direction output when the vehicle speed is low. The adjustment part also outputs the synthesized output in which the roll direction output is larger than the yaw direction output with respect to the yaw direction output and the roll direction output when the vehicle speed is high.

According to another embodiment of the invention, the adjustment part generates the synthesized output as a synthesized value composed of a value obtained by multiplying the yaw direction output by a first adjustment value and a value obtained by multiplying the roll direction output by a second adjustment value.

According to another embodiment of the invention, the adjustment part sets the first adjustment value such that the first adjustment value becomes large on a low speed side and small on a high speed side. The adjustment part sets the second adjustment value such that the second adjustment value becomes small on a low speed side and large on a high speed side.

According to another embodiment of the invention, assuming that the yaw direction output is Y, the first adjustment value is $\sin \phi$, the roll direction output is R, the second adjustment value is $\cos \phi$, a value which the $\phi$ takes is within 0 to $\pi/2$, a $\pi/2$ side of the $\phi$ is made to correspond to the lower vehicle speed and a 0 side of the $\phi$ is made to correspond to the high vehicle speed, and the synthesized value is S, the adjustment part (302) calculates the synthesized value S by a following formula.

$$S = Y \times \sin \phi + R \times \cos \phi.$$

According to another embodiment of the invention, the posture control device further includes another actuator which directly changes a mounting angle of the displacement detection sensor. The adjustment part adjusts the yaw direction output and the roll direction output by controlling the another actuator based on the vehicle speed.

According to another embodiment of the invention, the adjustment part adjusts an initial mounting angle of the displacement detection sensor to an angle at which the yaw direction output is larger than the roll direction output in a low vehicle speed region including a vehicle speed of zero through the another actuator.

According to another embodiment of the invention, the displacement detection sensor can be mounted on a line which connects a rear wheel ground contact point and a head pipe.

According to another embodiment of the invention, the actuator which controls the posture of the motorcycle is an electrically-operated motor which imparts a steering assist force to a steering shaft, and imparts the steering assist force in an inclination direction with respect to a roll direction of the motorcycle.

An embodiment of the invention can also include a motorcycle having the posture control device according to the above-discussed embodiments.

According to embodiments discussed above, in outputting the synthesized output by adjusting the yaw direction output and the roll direction output outputted from the displacement detection sensor respectively by the adjustment part, a synthesized output in which the yaw direction output is larger than the roll direction output is outputted when a vehicle speed is low. A synthesized output in which the roll direction output is larger than the yaw direction output is outputted when a vehicle speed is high. Accordingly, in either a case where the vehicle is traveling at a low speed or a case where the vehicle is traveling at a high speed, the posture control device can impart an assist force to a steering unit without giving discomfort to the operation or manipulation by a rider, and also the displacement and the behavior of a motorcycle can be detected with high accuracy thus eventually realizing the control of the posture of the motorcycle with high accuracy.

Also, the synthesized output can be formed as the synthesized value composed of the value obtained by multiplying the yaw direction output by the first adjustment value and the value obtained by multiplying the roll direction output by the second adjustment value. Accordingly, the output side from which a larger output is taken out can be determined by adjusting the first adjustment value and the second adjustment value. Therefore, the synthesized output can be easily taken out.

According to other embodiments, the first adjustment value is set large on a low speed side and small on a high speed side, and the second adjustment value is set small on a low speed side and large on a high speed side. Accordingly, the yaw direction output larger than the roll direction output can be taken out at a low speed side, and the roll direction output larger than the yaw direction output can be taken out at a high speed side. Therefore, the synthesized output can be easily taken out.

According to other embodiments, the synthesized value is obtained by the formula of yaw direction output×sin $\phi$+roll direction output×cos $\phi$, and the $\pi/2$ [radian] side of the $\phi$ is made to correspond to the lower vehicle speed and the 0 [radian] side of the $\phi$ is made to correspond to the high vehicle speed and hence, a proper synthesized value can be calculated corresponding to a vehicle speed.

According to other embodiments of the invention, the mounting angle of the displacement detection sensor is directly changed based on a vehicle speed using another actuator different from the actuator for controlling the posture. Therefore, the displacement and the behavior of the vehicle can be detected with high accuracy with the simple constitution thus further enhancing the accuracy of posture control.

According to other embodiments of the invention, another actuator sets an initial mounting angle of the displacement detection sensor to an angle at which the yaw direction output is larger than the roll direction output in the low vehicle speed region including a vehicle speed of zero. Therefore, the displacement and the behavior of the motorcycle can be detected with priority in the low speed region where the vehicle passes first in traveling.

According to other embodiments, the displacement detection sensor is mounted on the line which connects the rear wheel ground contact point and the head pipe. Therefore, the displacement detection sensor can be set to the mounting angle at which priority is assigned to the control in the low speed region where the vehicle passes first in traveling and frequency of traveling is the highest.

According to other embodiments of the invention, a steering assist force is imparted to the steering shaft by the electrically-operated motor in the direction that the motorcycle is inclined in the roll direction. Therefore, the fluctuation of the vehicle in the roll direction can be suppressed (fluctuation can be rapidly absorbed).

DETAILED DESCRIPTION

The present invention is explained hereinafter in detail in conjunction with preferable embodiments by reference to attached drawings.

Figure 1:
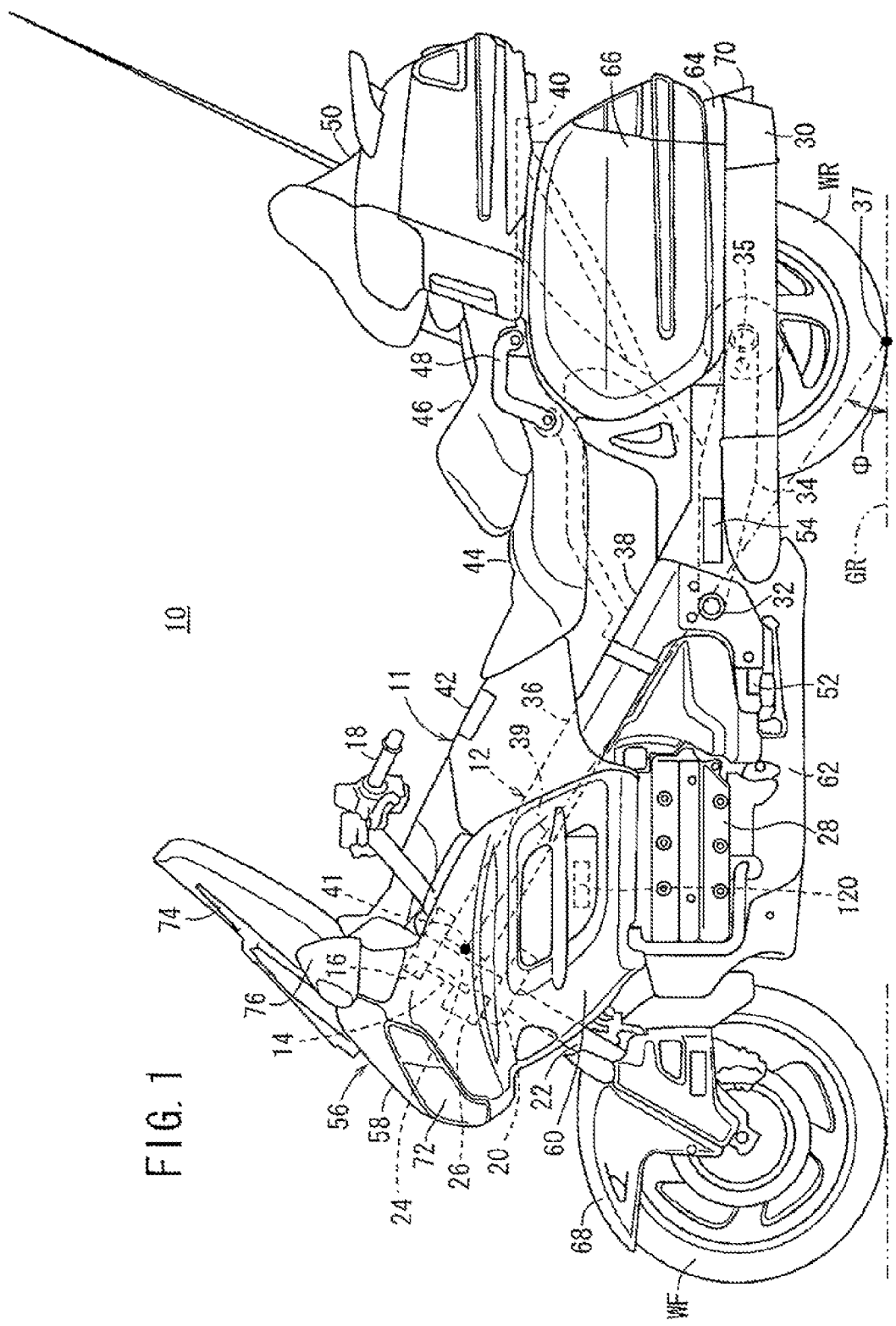
FIG. 1: A side view of a motorcycle according to an embodiment.
Figure 2:
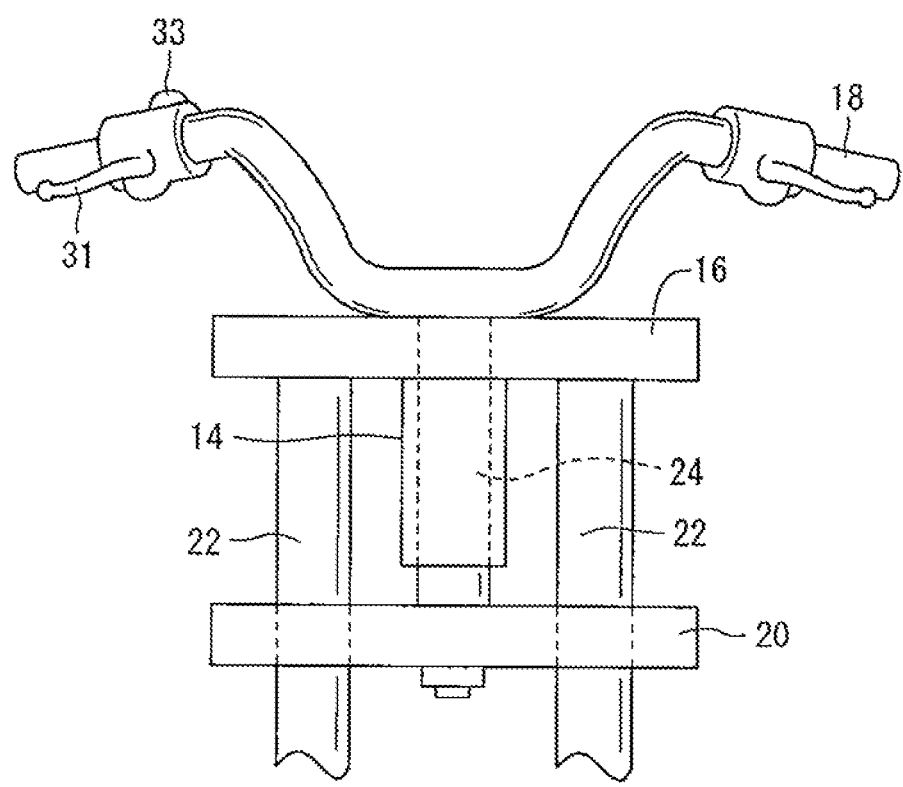
FIG. 2: A front view with a part cut away of the motorcycle shown in FIG. 1.

FIG. 1 is a side view of a motorcycle 10 on which a steering device of a saddle-ride-type vehicle such as a motorcycle is mounted. FIG. 2 is a front view with a part cut away of the motorcycle 10 shown in FIG. 1.

The motorcycle 10 can include a vehicle body frame 12 of a vehicle body 11, a head pipe 14 which is mounted on a front end portion of the vehicle body frame 12, a steering handle 18 which is connected to a top bridge 16 which is brought into slide contact with an upper end of the head pipe 14, a pair of left and right front forks 22 which is connected to both left and right ends of the top bridge 16. Front forks 22 penetrate a bottom bridge 20 and rotatably support a front wheel WF. A steering shaft 24 is inserted into the head pipe 14 and has one end thereof fixedly mounted on the top bridge 16 and another end thereof rotatably supported on the bottom bridge 20. A power assist portion 26 (see FIG. 1) transmits a steering assist force to the steering shaft 24. Engine 28 is supported on the vehicle body frame 12, and an exhaust muffler 30 is connected to the engine 28 by way of an exhaust pipe not shown in the drawing. A swing arm 34 has one end which is swingably supported on a pivot shaft 32 formed on a rear lower portion of the vehicle body frame 12 and the other end side where the rear wheel WR is rotatably supported.

A brake pressure detection sensor 33 (see FIG. 2) which detects and outputs a brake pressure Bp can be mounted on a brake reservoir tank not shown in the drawing which is arranged in the vicinity of a brake lever 31 of the steering handle 18. A brake pressure detection sensor may be also mounted on a brake reservoir tank for a foot brake not shown in the drawing. Here, the brake pressure detection sensor 33 may be also used as a sensor (brake detection sensor) which detects whether or not the brake lever 31 is manipulated (whether or not braking is made) based on a detected pressure. As the brake detection sensor, a switch which turns on a stop lamp in response to the manipulation of the brake lever 31 may be also used.

A vehicle speed sensor 35 which detects a vehicle speed V based on a wheel speed of the rear wheel WR can be mounted on the swing arm 34. The vehicle speed sensor may be also mounted on a counter shaft.

Further, a displacement detection sensor 41 which detects both the displacement of the motorcycle 10 in roll direction and the displacement of the motorcycle 10 in the yaw direction can be arranged at a distal end on a head-pipe-14 side on a line 39 which connects a ground contact point 37 where the rear wheel WR is brought into contact with a ground surface GR and an approximately center portion of the head pipe 14 to each other. An inclination angle with respect to a horizontal line (referred to as X axis) is referred to as a mounting angle φ of the displacement detection sensor 41.

The displacement detection sensor 41 outputs a roll direction output R (roll angular velocity component) and a yaw direction output Y (yaw angular velocity component).

Figure 3:
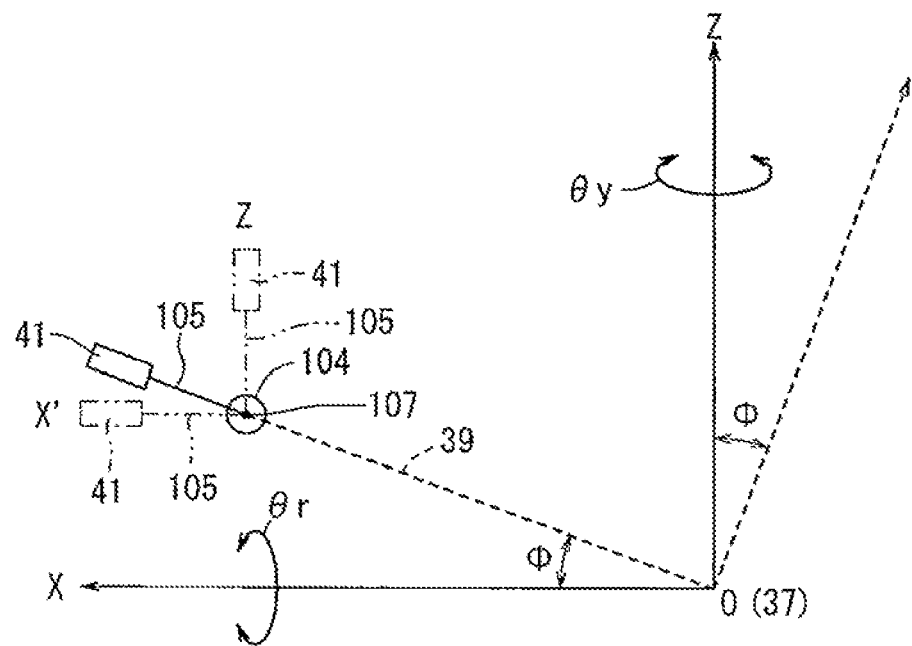
FIG. 3: An explanatory view of a roll angle and a yaw angle detected by the displacement detection sensor.

As shown in FIG. 3, a roll angle θr which is obtained as an integral value of the roll direction output R expresses a rotational angle around a horizontal line (assuming as X axis) which extends in the longitudinal direction of the vehicle, and a yaw angle θy which is obtained as an integral value of the yaw direction output Y expresses a rotational angle around an axis (assuming as Z axis) which vertically intersects with the X axis of the displacement detection sensor 41 with respect to a rear wheel contact point 37. The roll angle θr may be also referred to as an inclination angle of the motorcycle 10 in the lateral direction (in the vehicle widthwise direction).

The displacement detection sensor 41 has a characteristic that when (the axis of) the displacement detection sensor 41 is directed in the Z axis, the detection sensitivity of the yaw direction output Y becomes maximum and the detection sensitivity of the roll direction output R becomes minimum. Also, when (the axis of) the displacement detection sensor 41 is directed in the X axis, the detection sensitivity of the yaw direction output Y becomes minimum and the detection sensitivity of the roll direction output R becomes maximum.

Further, at a low speed, the motorcycle 10 exhibits a characteristic that a bank (roll) takes place after steering (yaw) using the steering handle 18 takes place. Therefore, it is preferable that the yaw takes place first and a yaw component larger than a roll component is detected. On the other hand, at a high speed, the motorcycle 10 exhibits a characteristic that steering (yaw) takes place after bank (roll) takes place. Therefore, it is preferable that the roll takes place first and the roll component larger than the yaw component is detected. These characteristics are referred to as steering characteristics of the motorcycle 10.

In view of the above, inventors of the present invention have made extensive studies on the steering characteristics, and have developed an invention that includes making an axis of the displacement detection sensor 41 coaxial with a line segment 39 which connects a ground contact point 37 of the rear wheel WR and an approximately center portion of the head pipe 14 and of mounting the displacement detection sensor 41 on a head pipe 14 side of the line segment 39.

Due to such mounting, the posture of the motorcycle 10 can be controlled with high accuracy by assigning priority on the low speed region including a stop time where velocity detected by the displacement detection sensor 41 is 0 (V=0).

The yaw angle θy and the roll angle θx can be suitably detected in all speed regions from a low speed region to a high speed region.

In certain embodiments, it can be preferable to adopt the constitution where a synthesized output is outputted by adjusting (weighting) the yaw direction output Y and the roll direction output R of the displacement detection sensor 41 in response to a detected vehicle speed V. Due to such a constitution, the control becomes easy.

The synthesized output is preferably an output in which the yaw direction output Y is larger than the roll direction output R when the vehicle speed V is low based on the above-mentioned steering characteristic of the motorcycle 10, and is preferably an output in which the roll direction output R is larger than the yaw direction output Y when the vehicle speed V is high based on the above-mentioned steering characteristic of the motorcycle 10.

For example, as can be understood from the following formula (1), a synthetic value (synthetic output) S which is composed of a value (Y×AD1) obtained by multiplying the yaw direction output Y by the first adjustment value AD1 and a value (R×AD2) obtained by multiplying the roll direction output R by the second adjustment value AD2 is formed.

$$S = Y \times AD1 + Y \times AD2 \qquad (1)$$

In this case, the first adjustment value AD1 can preferably be set to be large at a low speed side and small at a high speed side. Second adjustment value AD2 is preferably set small at a low speed side and large at a high speed side.

Further, to correlate (to link) the vehicle speed V and a mounting angle φ (pseudo mounting angle) of the displacement detection sensor 41 to each other, assuming that the first adjustment value AD1 is sin φ, the second adjustment value AD2 is cos φ, a value which the mounting angle φ (pseudo mounting angle) can take is set within 0 to π/2, and a π/2 (radian)(=90°) side of the mounting angle φ (pseudo mounting angle) is made to correspond to the lower vehicle speed and a 0(radian)(=0°) side of the mounting angle φ (pseudo mounting angle) is made to correspond to the high vehicle speed, the synthesized value (synthesized output) S can be calculated by a following formula (2).

$$S = Y \times \sin\phi + R \times \cos\phi \qquad (2)$$

Figure 4:
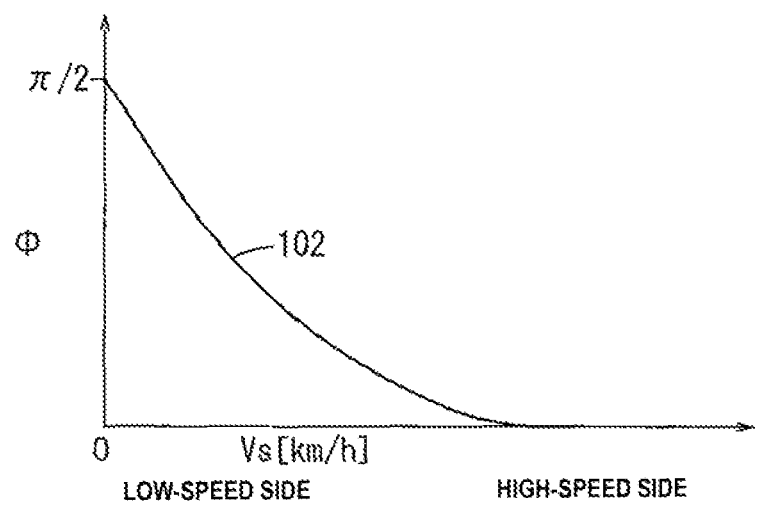
FIG. 4: An explanatory view showing a change characteristic of a mounting angle of a displacement detection sensor with respect to a vehicle speed.

FIG. 4 is a characteristic view showing a characteristic 102 indicative of one example of the relationship between the mounting angle φ (pseudo mounting angle) and the vehicle speed V which are substituted in the formula (2). It is understood from the characteristic curve that the synthesized value S becomes Y (S=Y)(R=0) by setting the mounting angle φ (pseudo mounting angle) to π/2 (φ=π/2) at the vehicle speed Vs on a low speed side, for example, when the vehicle is being stopped, while the synthesized value S becomes S (S=R) (Y=0) by setting the mounting angle φ (pseudo mounting angle) to 0 at a maximum vehicle speed Vs on a high speed side, for example, when the vehicle is being stopped.

In this embodiment, to facilitate the explanation of the invention, an upper limit value of φ is set to π/2. However, the upper limit value of φ is not limited to π/2 and may be suitably set to a value less than π/2.

Further, with respect to the mounting angle (I), as shown in FIG. 3, an actuator 104 which directly mechanically changes the mounting angle φ of the displacement detection sensor 41 by way of a connection arm 105 may be provided, and the mounting angle φ of the displacement detection sensor 41 may be changed between the X' direction (parallel to the X direction) and the Z' direction (parallel to the Z direction) by the actuator 104 in response to the vehicle speed V as shown in FIG. 3, the synthesized value (synthesized output) S may be directly adjusted.

By constituting the actuator 104 such that, for example, an electrically-operated motor is provided in the inside of a space of the head pipe 14, and a connection arm 105 which has one end thereof connected to the displacement detection sensor 41 and the other end thereof connected to a shaft 107 of the actuator 104 (electrically-operated motor) is rotated by the mounting angle φ shown in FIG. 3 corresponding to a vehicle speed V, the mounting angle φ of the displacement detection sensor 41 can be adjusted thus mechanically adjusting the synthetic value (synthetic output) Y corresponding to the vehicle speed V (mechanical adjustment).

Referring again to FIG. 1, the vehicle body frame 12 includes a pair of left and right main frames 36 which is bifurcated laterally from the head pipe 14 and extends obliquely in the rearward and downward direction. A pair of left and right pivot plates 38 which is connected to rear portions of the main frames 36. A pair of left and right seat frames 40 extends obliquely in the rearward and upward direction from a front portion and a rear portion of the pivot plates 38.

A fuel tank 42 is mounted on the main frames 36, a rider's seat 44 and a pillion's seat 46 are mounted on an upper portion of the seat frames 40. Grab rails 48 and a trunk box 50 are mounted on a rear portion of the pillion's seat 46.

A pair of left and right steps 52 for a rider who sits on the rider's seat 44 and a pair of left and right steps 54 for a pillion who sits on the pillion's seat 46 are mounted on the pivot plates 38 of the vehicle body frame 12.

A vehicle body cowling or fairing 56 is mounted on the vehicle body frame 12, and the vehicle body cowling 56 includes a front cover 58 which covers a front side of the vehicle body, a pair of left and right side covers 60 which covers side portions of the vehicle body, an under cover 62 which covers a lower portion of the vehicle body. A rear seat cowl 64 covers a rear side of the vehicle body. A pair of left and right saddle backs is integrally formed on the rear seat cowl 64. Further, a front fender 68 which covers the front wheel WF is mounted on the front forks 22, and a rear fender 70 which covers the rear wheel WR is mounted on the rear seat cowl 64.

A headlight 72 is mounted on a front surface of the front cover 58, a wind shield 74 is mounted on an upper portion of the headlight 72, and a side mirror 76 is mounted on left and right ends of the headlight 72.

Figure 5:
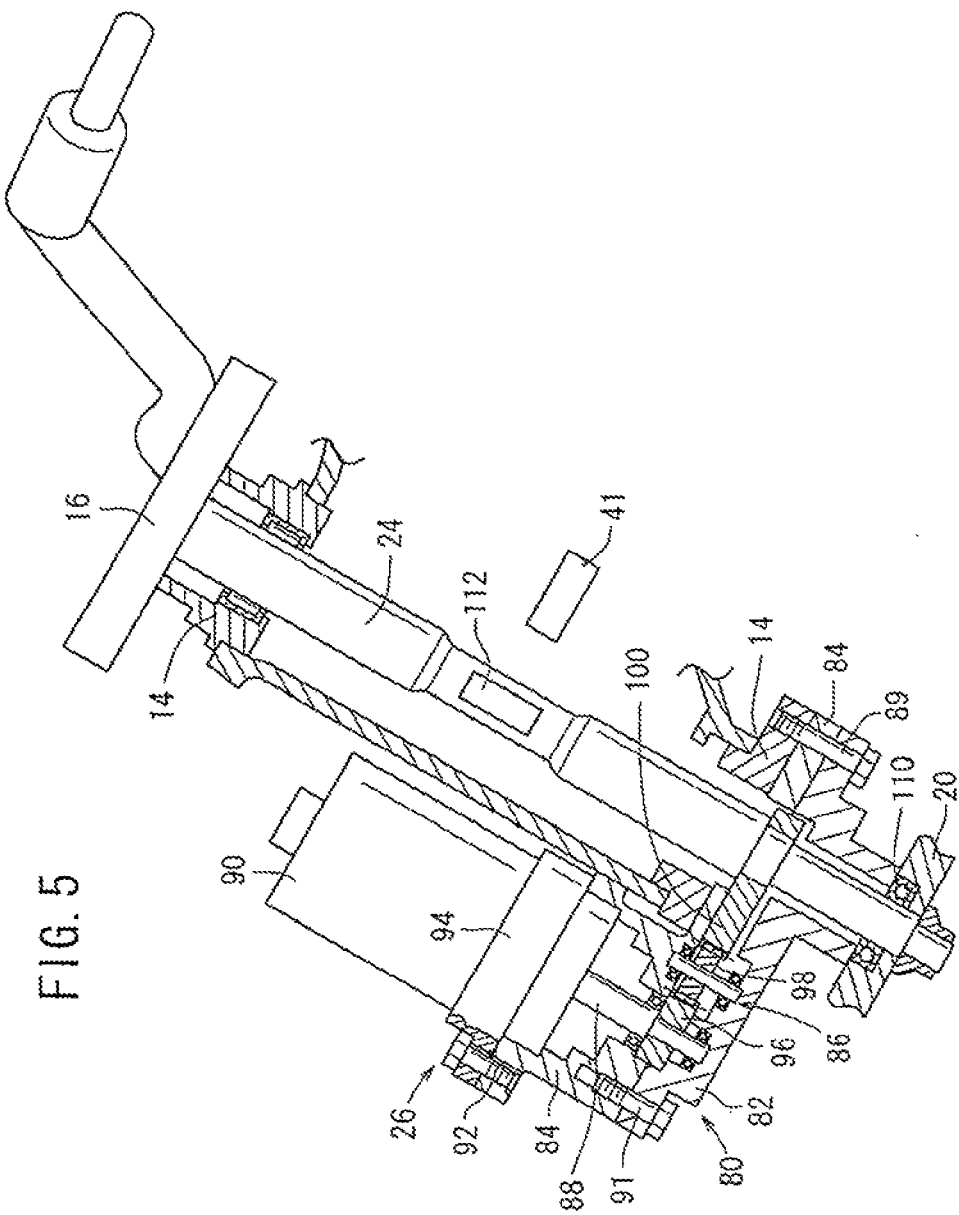
FIG. 5: An explanatory cross-sectional view with a part cut away of a power assist part.

FIG. 5 is an explanatory view with a part cut away of the head pipe 14 and an area in the vicinity of the head pipe 14 including the power assist portion 26 which transmits a steering assist force to the steering shaft 24.

The power assist portion 26 is basically constituted of an electrically-operated motor 90, and a support and transmission member 80 which supports the electrically-operated motor 90 and transmits a rotational drive force of the electrically-operated motor 90 to the steering shaft 24.

The electrically-operated motor 90 is mounted on a bottom bridge 20 side of the head pipe 14 by way of the support and transmission member 80.

The support and transmission member 80 is constituted of a base member 82, a holding member 84, and a transmission mechanism 86 (gear mechanism (gear train)) which is interposed between the base member 82 and the holding member 84.

A lower end side of the base member 82 is connected to the bottom bridge 20, one end portion of an upper end side of the base member 82 is connected to the head pipe 14 by way of a bolt 89 which penetrates the holding member 84, and the other end portion on the upper end side of the base member 82 is connected to the holding member 84 by way of a bolt 91.

The electrically-operated motor 90 having a rotary drive shaft 88 is held on the holding member 84 by way of, for example, a support member 94 having a band-shaped portion.

A drive gear 96 is fixedly mounted on the rotary drive shaft 88 of the electrically-operated motor 90 concentrically, and a drive gear 96 is meshed with a driven gear 100 which is a sector gear by way of an idle gear 98.

The driven gear 100 is fixedly mounted on a bottom bridge 20 side of the steering shaft 24 which is rotatably engaged with a bearing 110 of the bottom bridge 20.

On a narrowed portion of a substantially center portion of the steering shaft 24, a steering torque sensor 112 which is a strain gauge torque sensor and detects and outputs a steering torque Ts corresponding to a manipulation force (steering force) of the steering handle 18 by the rider is mounted. Here, the steering torque Ts may be detected by a magnetostrictive torque sensor or the like besides the strain gauge torque sensor. The turning direction of the steering handle 18 can be also detected by reference to a sign of the steering torque Ts.

The electrically-operated motor 90 is arranged on a front lower end portion of the head pipe 14 parallel to the head pipe 14, thus securing space utilization efficiency.

A control unit 120 which includes a drive part for driving the electrically-operated motor 90 and a control part is mounted in a space portion formed by an upper portion of the engine 28, a lower side of the main frames 36 and the side covers 60.

Figure 6:
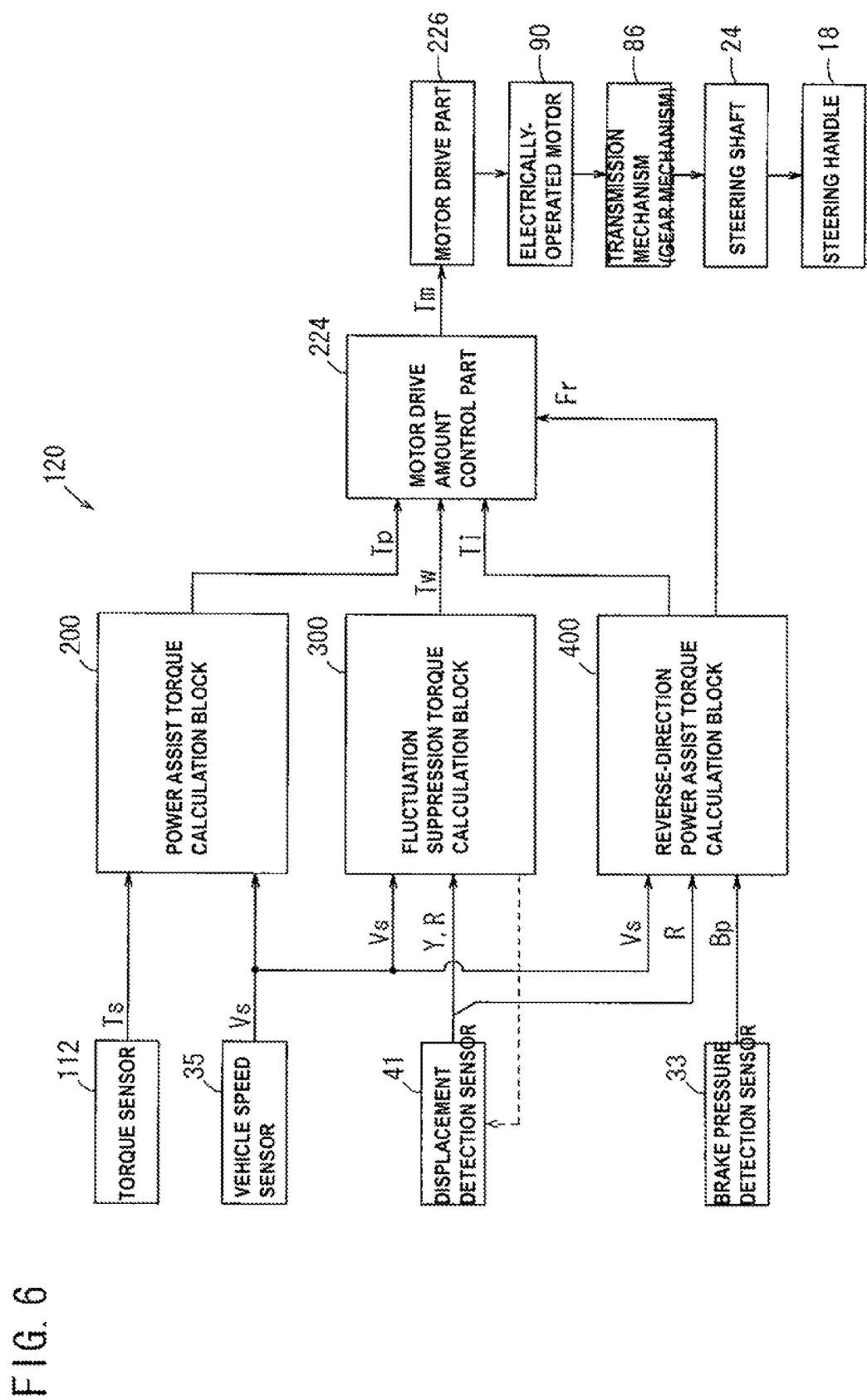
FIG. 6: A block diagram of a total control.

FIG. 6 is a block diagram for explaining the detailed constitution of the control unit 120. The control unit 120 has the constitution which includes an ECU (Electronic Control Unit). The ECU is a computer including a microcomputer, and includes a CPU (Central Process Unit), a ROM which is a memory (also including an EEPROM), a RAM (Random Access Memory). The ECU further includes input/output devices such as an A/D converter and a D/A converter, a timer which constitutes a time counting part and the like. The ECU functions as various function realizing parts (function realizing means) by allowing the CPU to read and execute programs stored in the ROM.

In this embodiment, the ECU functions as a power assist torque calculation block 200, a fluctuation suppression torque calculation block 300, a reverse-direction power assist torque calculation block 400 and the like which constitute assist force control parts respectively. The respective blocks 200, 300, 400 may be operated independently as described later, may be operated as the whole, or two arbitrary blocks may be combined with each other and be operated in combination.

First Embodiment

Constitution and Manner of Operation of Power Assist Torque Calculation Block 200

In this first embodiment, a motor drive amount control part 224 is configured to directly connect an input and an output (Tp=Tm).

Figure 7:
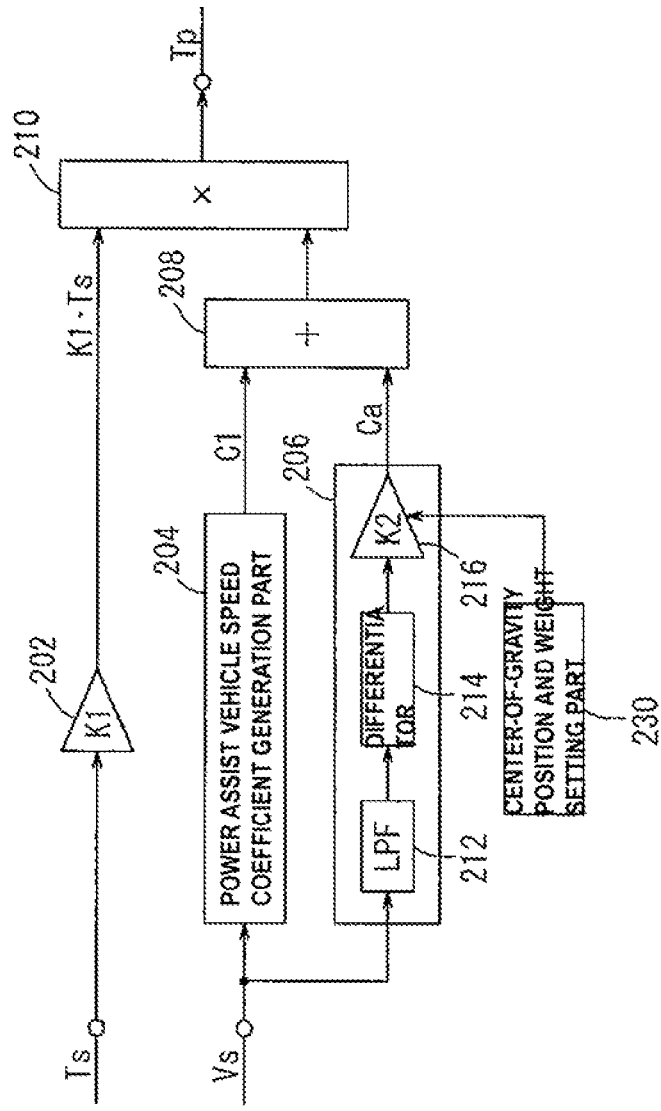
FIG. 7: A detailed view of a power assist torque calculation block in the total control block shown in FIG. 6.

As shown in FIG. 7, the power assist torque calculation block 200, which constitutes the assist force control part, can include a gain adjuster 202 which outputs a steering torque K1·Ts which is obtained by multiplying a steering torque Ts detected by a steering torque sensor 112 based on a steering force applied to the steering handle 18 by a rider by a gain K1. A power assist vehicle speed coefficient generation part 204 can generate a power assist vehicle speed coefficient C1 based on a vehicle speed Vs detected by a vehicle speed sensor 35.

A correction coefficient generation part 206 generate a correction coefficient Ca for increasing or decreasing the power assist vehicle speed coefficient C1 corresponding to acceleration or deceleration calculated based on the vehicle speed Vs. An adder 208 add the power assist vehicle speed coefficient C1 and the correction coefficient Ca and outputs a coefficient (C1+Ca). A multiplier 210 which constitutes a motor drive torque calculation part which outputs a power assist torque (assist torque) Tp indicated by the following formula (3) where a steering torque K1·Ts is multiplied by the coefficient (C1+Ca).

$$Tp = K1 \cdot Ts \cdot (C1 + Ca) \qquad (3)$$

The correction coefficient generation part 206 can be constituted of a series circuit constituted of a low-path filter (LPF) 212, a differentiator 214 and a variable gain adjuster 216. The differentiator 214 detects whether traveling is acceleration (value being +) traveling, deceleration (value being −) traveling or constant speed (value being 0 or nearly 0) traveling by differentiating the vehicle speed Vs. In general, a differential value of measured data is largely influenced by sensor noises. Although the control of the vehicle speed differential value is not largely influenced by a phase delay in physical feeling of a rider, by applying LPF process to the vehicle speed Vs using the low-path filter 212 before the differentiation performed by the differentiator 214, undesired fluctuation is suppressed.

The power assist torque Tp{Tp=K1·Ts·(C1+Ca)} outputted from the multiplier 210 is supplied to the motor drive part 226 through the motor drive amount control part 224 as the motor drive torque Tm.

Here, assuming that the motor drive torque Tm is equal to the power assist torque Tp{Tp=K1·Ts·(C1+Ca)}, the motor drive part 226 converts the motor drive torque Tm (in this case Tm=Tp) into a motor current for generating a torque (referred to as torque current) and supplies the torque current to the electrically-operated motor 90.

During a period where the torque current is supplied, a drive force corresponding to magnitude of the torque current is generated so that the electrically-operated motor 90 is rotated, the rotation of the electrically-operated motor 90 is converted into a force which rotates the steering shaft 24 by way of a transmission mechanism 86, and an assist force (steering assist force) corresponding to the motor drive torque Tm (in this case, power assist torque Tp) is imparted to the steering handle 18 by way of the steering shaft 24.

Figure 8:
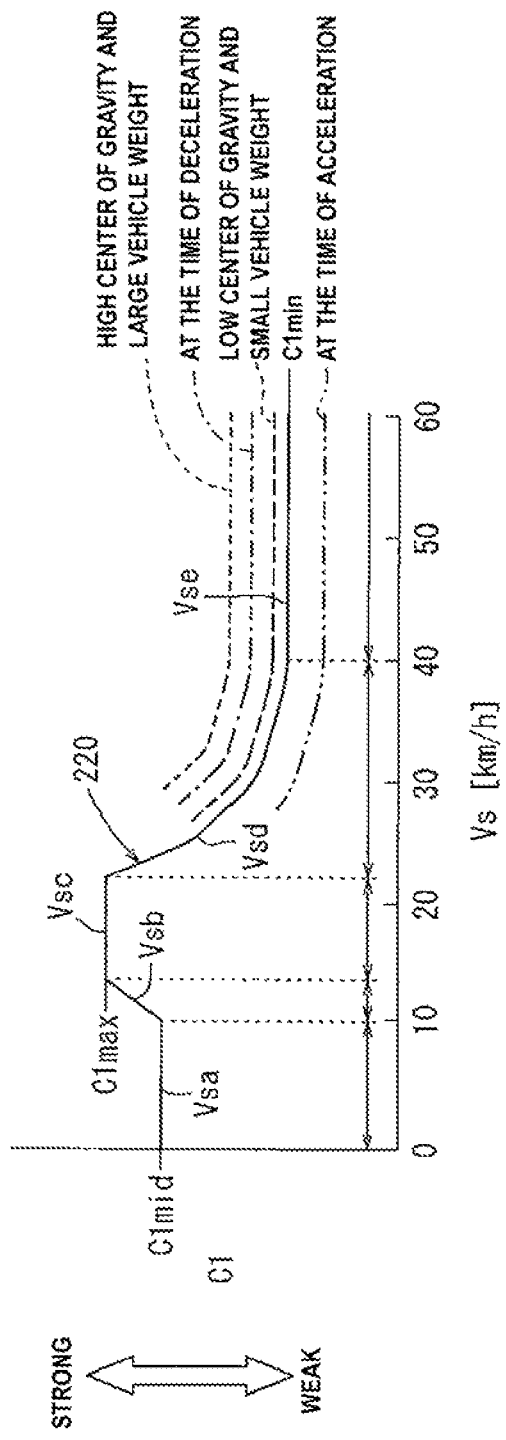
FIG. 8: An explanatory view showing a characteristic of a power assist vehicle speed coefficient.

FIG. 8 shows a characteristic 220 of the power assist vehicle speed coefficient C1 stored in a memory (storage part) not shown in the drawing in the control unit 120. Here, the power assist vehicle speed coefficient C1 is, as indicated by the formula (3), a constant of proportionality (coefficient) multiplied to a steering torque K1·Ts at the time of generating the power assist torque Ta. Therefore, it is considered that the power assist vehicle speed coefficient C1 corresponds to an assist force (steering assist force). The power assist vehicle speed coefficient C1 may take a value which falls within a range of 0<C1≤1, for example.

As can be understood from the characteristic 220, in a low vehicle speed region Vsc, the assist force (power assist vehicle speed coefficient C1) is set such that the assist force includes a maximum value C1max. In a high vehicle speed region Vsd where the vehicle speed is higher than the vehicle speed in the low vehicle speed region Vsc, the assist force (power assist vehicle speed coefficient C1) is set such that the assist force (power assist vehicle speed coefficient C1) includes a minimum value C1min. In a stop state (Vs=0), an intermediate value C1mid between the maximum value C1max of the assist force (power assist vehicle speed coefficient C1) and the minimum value C1min of the assist force (power assist vehicle speed coefficient C1) is set (C1min<C1mid<C1max). A specific value of the intermediate value C1mid may be set such that the assist force which amounts 50[%] of the steering torque K1·S is imparted to the steering handle 18.

As shown in FIG. 8, in a very low vehicle speed region Vsa in the vicinity of the vehicle speed of zero ranging from the stop state (Vs=0) to the low vehicle speed region Vsc, the fixed intermediate value C1mid is set. A specific value of the intermediate value C1mid of the power assist vehicle speed coefficient C1 may be set such that the assist force which amounts 50[%] of the steering torque K1·Ts is imparted to the steering handle 18, for example (Tp=C1mid×K1·Ts=0.5×K1·Ts). A specific value of the maximum value C1max in the low vehicle speed region Vsc may be set such that the assist force which amounts 60[%] of the steering torque K1·Ts is imparted to the steering handle 18, for example (Tp=C1mid×K1·Ts=0.6×K1·Ts).

Further, as shown in FIG. 8, in a transition region Vsb from the very low vehicle speed region Vsa to the low vehicle speed region Vsc, the assist force (power assist vehicle speed coefficient C1) is set such that the assist force is gradually increased along with the increase of the vehicle speed Vs.

To explain the specific vehicle speeds in the vehicle speed regions, these specific vehicle speeds are respectively substantially set such that the very low vehicle speed region Vsa including the vehicle speed Vs relating to so-called one bridge traveling or the like is set to a range of 0≤Vsa≤15[km/h], the low vehicle speed region Vsc is set to a range of 5≤Vsc≤25 [km/h], the high vehicle speed region (middle vehicle speed region) Vsd is a range of 20≤Vsd≤45[km/h], and the very high vehicle speed region (high vehicle speed region) Vse is set to a range of 40[km/h]≤Vse. It is preferable that these respective regions are set such that the neighboring ranges do not overlap with each other depending on a vehicle type, a machine type or the like.

The correction coefficient generation part 206 sets the correction coefficient Ca with respect to the power assist vehicle speed coefficient C1 having the characteristic 220 by adjusting a gain K2 such that a change in steering weight feeling due to the increase or the decrease of a front allocated load on a front wheel WF side at the time of acceleration or at the time of deceleration becomes small as shown in FIG. 8 where the deceleration time is indicated by a chained line and the acceleration time is indicated by a chain double-dashed line. To be more specific, at the time of acceleration, the front allocated load is decreased. Therefore, the correction coefficient Ca is decreased by adjusting the gain K2 such that the assist force is decreased, while at the time of deceleration, the front allocated load is increased. Therefore, the correction coefficient Ca is increased by adjusting the gain K2 such that the assist force is increased.

In FIG. 8, as indicated by dotted lines above and below the characteristic at the time of deceleration indicated by a chained line, when the center of gravity is high and a vehicle weight is large, a change in steering feeling at the time of deceleration becomes apparent. Therefore, it is preferable to adopt a characteristic where an adjustment width of the gain K2 at the time of deceleration is set larger on a side where the correction coefficient Ca becomes large. On the other hand, when the center of gravity is low and the vehicle weight is small, the change in steering feeling at the time of deceleration becomes gentle. Therefore, it is preferable to set the adjustment width of the gain K2 at the time of deceleration smaller on a side where the correction coefficient Ca becomes small. Although not shown in the drawing, in the same manner, above and below the characteristic at the time of acceleration indicated by a chain double-dashed line, when the center of gravity is high and the vehicle weight is large, a change in steering feeling at the time of acceleration becomes apparent. Therefore, it is preferable to adopt a characteristic where an adjustment width of the gain K2 at the time of acceleration is set larger on a side where the correction coefficient Ca becomes small (below the acceleration time characteristic in FIG. 8). On the other hand, when the center of gravity is low and the vehicle weight is small, the change in steering feeling at the time of acceleration becomes gentle and hence, it is preferable to adopt a characteristic where the adjustment width of the gain K2 at the time of acceleration is set smaller on a side where the correction coefficient Ca becomes large (above the acceleration time characteristic in FIG. 8).

The adjustment width of the gain K2 at the time of deceleration or at the time of acceleration is configured to change the gain K2 of a variable gain adjuster 216 by setting performed by a center-of-gravity position and weight setting part 230 corresponding to a type of vehicle, a type of machine or the like.

Further, as can be understood from FIG. 8, the characteristic 220 of the power assist vehicle speed coefficient C1 is set such that a steering weight feeling is gradually increased along with the rise of a vehicle speed while realizing a light manipulation force of the steering handle 18 with a steeling assist force in all vehicle speed regions.

According to the first embodiment, the power assist torque calculation block 200 which constitutes the assist force control part for setting an assist force added to a manipulation force imparted to the steering handle 18 due to the electrically-operated motor 90, as shown in FIG. 8, sets a coefficient C1max such that the coefficient C1max includes a maximum value of the assist force in the low vehicle speed region Vsc, sets a coefficient C1min such that the coefficient C1min includes a minimum value of the assist force in the high vehicle speed regions Vsd, Vse at a speed higher than the low vehicle speed region Vsc, and sets a coefficient C1mid such that the coefficient C1mid assumes an intermediate value between the maximum value of the assist force and the minimum value of the assist force in a stop state. Therefore, a proper assist force which is neither too strong not too weak can be imparted in a stop state of the motorcycle 10.

Accordingly, in parking the motorcycle 10 which is parked in a narrow parking space frequently, the steering handle 18 can be easily manipulated. Therefore, the motorcycle 10 can be parked at a predetermined parking position within a short time.

In this case, the power assist torque calculation block 200 which constitutes the assist force control part is configured to set the coefficient C1mid set as the intermediate value as a fixed value in the very low vehicle speed region Vsa ranging from a stop state (Vs=0) to the low vehicle speed region Vsc. With respect to the motorcycle 10, in a stop state and at the time of traveling at a very low vehicle speed, although there is a tendency that an extra force is applied to the manipulation (steering) of the steering handle 18 by a rider for keeping the posture of a vehicle, by setting the assist force of the fixed intermediate value which is smaller than the coefficient C1max by which the maximum value of the assist force is imparted to the steering handle 18 and larger than the minimum value Camin, it is possible to prevent the assist force from becoming too sensitive to a manipulation force of the steering handle 18 by a rider. That is, a proper assist force can be imparted to the manipulation (steering) of the steering handle 18 in a stop state.

In the transition region Vsb from the very low vehicle speed region Vsa to the low vehicle speed region Vsc, the power assist vehicle speed coefficient C1 corresponding to the assist force is set to be increased along with the increase of a vehicle speed. Therefore, a sharp change of the assist force can be prevented.

Further, at least in the high vehicle speed regions Vsd, Vse, the power assist vehicle speed coefficient C1 is corrected such that the assist force is decreased at the time of acceleration, and the power assist vehicle speed coefficient C1 is corrected such that the assist force is increased at the time of deceleration. At the time of acceleration in the high vehicle speed regions Vsd, Vse, a front load is lowered so that the steering of the steering handle 18 is liable to become light. In this case, by a proper handle steering feeling can be acquired by decreasing an assist force (making the steering of the steering handle heavy). At the time of deceleration in the high vehicle speed regions Vsd, Vse, the front load is increased so that the steering of the steering handle 18 becomes heavy. In this case, manipulability in the high vehicle speed regions Vsd, Vse is enhanced by making handle steering light with the increase of an assist force (making the steering of the steering handle light). The correction of the assist force at the time of acceleration or at the time of deceleration may be set in all vehicle speed regions.

Further, an assist force applied to the motorcycle 10 having the center of gravity at a relatively high position is set large compared to an assist force applied to the motorcycle 10 having the center of gravity at a relatively low position. Therefore, it is also possible to impart a proper assist force to a vehicle where a front load is largely influenced by acceleration or deceleration due to the center of gravity at a high position.

In the same manner, an assist force applied to the motorcycle 10 having a relatively large vehicle weight is set large compared to an assist force applied to the motorcycle 10 having a relatively small vehicle weight. Therefore, it is also possible to impart a proper assist force to a vehicle where a front load is largely influenced by acceleration or deceleration due to the large vehicle weight.

In this manner, according to the first embodiment, an assist force which assists a manipulation force (steering force) of the steering handle 18 can be imparted by using the power assist torque Tp which is obtained by only making use of the power assist torque calculation block 200 as the motor drive torque Tm (Tm=Tp).

Second Embodiment

Constitution and Manner of Operation of Fluctuation Suppression Torque Calculation Block 300

In the second embodiment, a motor drive amount control part 224 basically functions as an adder (Tm=Tp+Tw). The motor drive amount control part 224 can be modified such that the motor drive amount control part 224 performs a direct connection operation (Tm=Tw).

Figure 9:
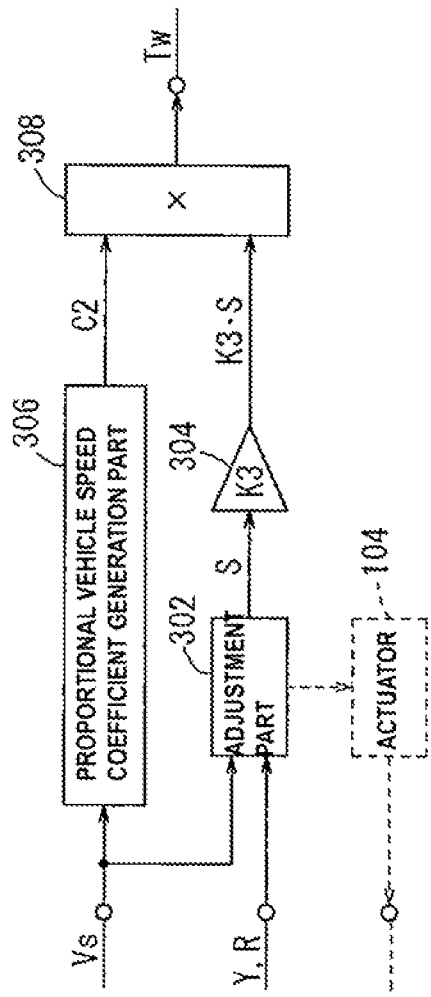
FIG. 9: A detailed view of a fluctuation suppression torque calculation block in the total control block shown in FIG. 6.

As shown in FIG. 9, the fluctuation suppression torque calculation block 300 which constitutes an assist force control part includes an adjustment part 302 which outputs a synthesized output S by adjusting a yaw direction output Y and a roll direction output R outputted from a displacement detection sensor 41 which detects displacements of a vehicle in the yaw direction and the roll direction, a gain adjuster 304 which converts the synthesized output S into a fluctuation suppression torque K3·S by multiplying the synthesized output S by gain K3 times and outputs the fluctuation suppression torque K3·S, a proportional vehicle speed coefficient generation part 306 which generates a fluctuation suppression vehicle speed coefficient (proportional value vehicle speed coefficient) C2 based on a vehicle speed Vs outputted from a vehicle speed sensor 35, and a multiplier 308 which constitutes a motor drive torque calculation part for outputting a fluctuation suppression torque (assist torque) Tw expressed by the following formula (4) which is obtained by multiplying the fluctuation suppression torque K3·S by the proportional vehicle speed coefficient C2.

$$Tw=K3 \cdot S \cdot C2 \qquad (4)$$

The fluctuation suppression torque Tw (Tw=K3·S·C2) outputted from the multiplier 308 is added to a power assist torque Tp=K1·Ts·(C1+Ca) by the motor drive amount control part 224, and the synthesized torque of the power assist torque Tp and the fluctuation suppression torque Tw is supplied to the motor drive part 226.

The motor drive part 226 converts the synthesized torque of the power assist torque Tp and the fluctuation suppression torque Tw (Tp+Tw=K1·Ts·(C1+Ca)+K3·C·2) into a torque current, and supplies the torque current to an electrically operated motor 90.

During a period where the torque current is supplied, a drive force corresponding to magnitude of the torque current is generated so that the electrically-operated motor 90 is rotated, the rotation of the electrically-operated motor 90 is converted into a force which rotates the steering shaft 24 by way of a transmission mechanism 86, and an assist force (steering assist force) is imparted to the steering handle 18 by way of the steering shaft 24.

Figure 10:
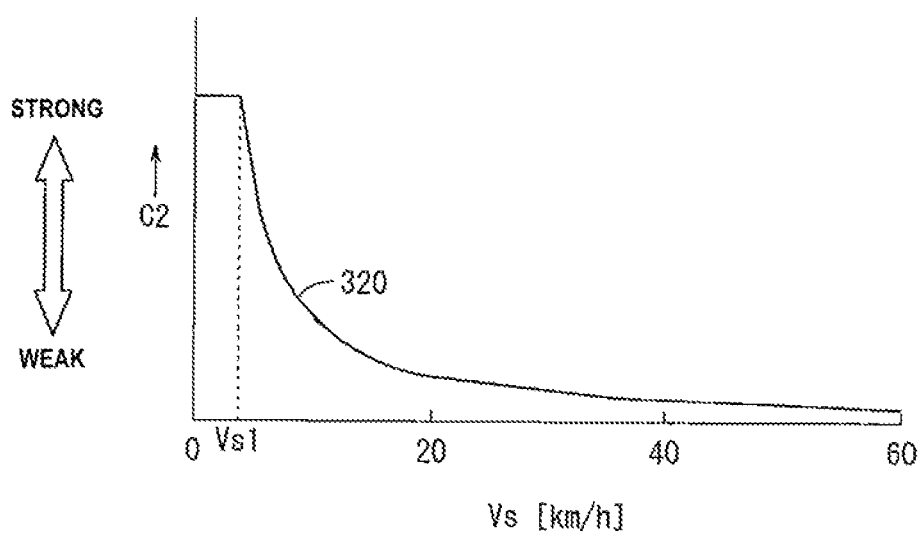
FIG. 10: An explanatory view showing a characteristic of a proportional vehicle speed coefficient.

FIG. 10 shows a characteristic 320 of a proportional value vehicle speed coefficient C2 stored in a memory not shown in the drawing in the control unit 120. The proportional value vehicle speed coefficient C2 takes a value within a range of 0<C2≤1. A relatively large fixed value is set as the proportional value vehicle speed coefficient C2 within a range of vehicle speed Vs from 0 to a vehicle speed Vs1 of approximately several [km/h], and a relatively small value is set as the proportional value vehicle speed coefficient C2 when the vehicle speed is equal to or more than the vehicle speed Vs1 to a vehicle speed Vs of approximately 20[km/h] (Vs=20 [km]). The proportional value vehicle speed coefficient C2 is set such that the proportional value vehicle speed coefficient C2 is slightly decreased within a range of vehicle speed Vs from 20[km] to 60[km/h].

In the motorcycle 10, the higher the vehicle speed, the more a self standing force is increased. Therefore, the higher the vehicle speed, the smaller the proportional value vehicle speed coefficient C2, that is, a fluctuation suppression coefficient is set.

On the other hand, with respect to the synthesized output S of the adjustment part 302, as has been explained in conjunction with the formula (1), the formula (2) and the formula (3), the synthesized output S is outputted such that the yaw direction output Y is larger than the roll direction output R on a low speed side, and the roll direction output R is larger than the yaw direction output Y on a high speed side.

As a result, while an assist force which steers the steering handle 18 in the direction where the vehicle body 11 falls is imparted to the steering shaft 24 through the electrically operated motor 90, the fluctuation suppression torque Tw (Tw=K3·S·C2) can suppress the fluctuation relating to the yaw direction output Y on a low speed side, and can suppress the fluctuation relating to the roll direction output R on a high speed side. The larger the synthesized output S corresponding to the output value of the displacement detection sensor 41 and the proportional value vehicle speed coefficient C2 respectively, the larger the fluctuation suppression torque Tw (Tw=K3·S·C2) becomes and hence, it is understood that an assist force corresponding to the fluctuation suppression torque Tw can be increased.

When the power steering is controlled with the motor drive torque Tm expressed as Tm=Tp+Tw which is an addition value (synthesized value) of the power assist torque Tp and the fluctuation suppression torque Tw, a proper assist force is imparted to the steering handle 18 in all regions from a stop state to the high speed region. For example, an assist force attributed to the power assist torque Tp is imparted in a stop state. Therefore, positioning at a parking position or the like is facilitated. The fluctuation at the time of low speed traveling including one bridge traveling or the like is detected by taking out the yaw direction output Y larger than the roll direction output R, the fluctuation at the time of high speed traveling is detected by taking out the roll direction outputs R larger than the yaw direction output Y, and a steering assist force, that is, the steering angle corresponding to a fluctuation suppression torque Tw is imparted in the direction that the vehicle body 11 falls and hence, a ground contact point is moved whereby the posture of the motorcycle is controlled such that the vehicle body 11 is raised.

According to the above-mentioned second embodiment, in the posture control device of the motorcycle 10 provided with the posture control system which controls the posture of the motorcycle 10 by detecting the posture of the motorcycle 10 and by controlling the steering unit (including at least one of the steering handle 18, the top bridge 16, the bottom bridge 20, the steering shaft 24, the front fork 22, the front wheel WF and the like) of the motorcycle 10 based on a detection result. The posture control system can include vehicle speed sensor 35 which detects the vehicle speed Vs of the motorcycle 10. The displacement detection sensor 41 detect displacement of the motorcycle 10 in the yaw direction and displacement of the motorcycle 10 in the roll direction and outputs the yaw direction output Y and the roll direction output R. Adjustment part 302 can output the synthesized output S by adjusting the yaw direction output Y and the roll direction output R of the displacement detection sensor 41 corresponding to the detected vehicle speed Vs. The actuator (in the second embodiment, the electrically-operated motor 90) can control the posture of the motorcycle 10 based on the synthesized output S. In outputting the synthesized output S by adjusting the yaw direction output Y and the roll direction output R outputted from the displacement detection sensor 41 by the adjustment part 302 respectively, a synthesized output S in which the yaw direction output Y is larger than the roll direction output R is outputted with respect to the yaw direction output Y and the roll direction output R when a vehicle speed Vs is low, and a synthesized output S in which the roll direction output R is larger than the yaw direction output Y is outputted with respect to the yaw direction output Y and the roll direction output R when a vehicle speed Vs is high. Accordingly, in addition to or independently from the advantageous effects obtained by the above-mentioned first embodiment, in either a case where the vehicle is traveling at a low speed or a case where the vehicle is traveling at a high speed, the displacement and behavior of the motorcycle 10 can be detected with high accuracy thus eventually realizing the control of the posture of the motorcycle 10 with high accuracy.

As shown in formula (1), the synthesized output S is formed as the synthesized value (synthesized output) (S=Y×AD1+R×AD2) of the value obtained by multiplying the yaw direction output Y by the first adjustment value AD1 (Y×AD1) and the value obtained by multiplying the roll direction output R by the second adjustment value AD2 (R×AD2). Accordingly, one output larger than the other output with respect to the yaw direction output Y and the roll direction output R can be determined by adjusting the first and second adjustment values AD1, AD2. Therefore, the synthesized value (synthesized output) S can be easily taken out.

To be more specific, the first adjustment value AD1 is set large on a low speed side and small on a high speed side, and the second adjustment value AD2 is set small on a low speed side and large on a high speed side reversely. Accordingly, the yaw direction output larger than the roll direction output can be taken out at a low speed side, and the roll direction output larger than the yaw direction output can be taken out at a high speed side. Therefore, the synthesized output can be easily taken out.

As expressed by the formula (2), the synthesized value (synthesized output) S is obtained by the formula of yaw direction output Y×sin φ+roll direction output R×cos φ, and the π/2 [radian] side of the φ is made to correspond to the lower vehicle speed and the 0 [radian] side of the φ is made to correspond to the high vehicle speed. Therefore, the synthesized value (synthesized output) S of a proper value can be calculated corresponding to a vehicle speed Vs.

Further, the mounting angle φ of the displacement detection sensor 41 is directly changed through the adjustment part 302 based on a vehicle speed Vs using another actuator 104 (see FIG. 3 and FIG. 9) different from the electrically-operated motor 90 which constitutes the actuator for controlling the posture. Therefore, the displacement and the behavior of the vehicle body 11 can be detected with high accuracy with the simple constitution thus also enhancing the accuracy of posture control.

In this case, another actuator 104 sets an initial mounting angle of the displacement detection sensor 41 to an angle at which the yaw direction output Y becomes a main component in the low vehicle speed region including a vehicle speed of zero. Therefore, the displacement and the behavior of the motorcycle 10 can be detected with high sensitivity in the low speed region where the vehicle passes first in traveling. The initial mounting angle may be set to an angle at which the yaw direction output Y and the roll direction output R satisfy the relationship of yaw direction output Y>roll direction output R≠0, for example.

Here, the displacement detection sensor 41 is mounted on the line 39 which connects the rear wheel ground contact point 37 and the head pipe 14 in the vicinity of the center of the head pipe 14 on a head pipe 14 side. Accordingly, the displacement detection sensor can be set at the mounting angle φ at which priority is assigned to the control in the low speed region where the motorcycle 10 passes first in traveling and frequency of traveling is the highest.

Still further, a steering assist force is imparted to the steering shaft 24 by the electrically-operated motor 90 (the actuator for controlling the posture) in the direction that the motorcycle 10 is inclined in the roll direction. Therefore, the fluctuation of the vehicle body (vehicle) 11 in the roll direction can be suppressed (fluctuation can be rapidly absorbed).

Third Embodiment

Constitution and Manner of Operation of Reverse-Direction Power Assist Torque Calculation Block In this third embodiment, a motor drive amount control part 224 is switched based on a state of an inclined traveling determination flag Fr supplied from an inclined traveling determination part 410, wherein when the inclined traveling determination flag Fr is set to 1 (Fr=1), an output of the reverse-direction power assist torque calculation block 400 which constitutes the assist force control part and an input of a motor drive part 226 are brought into a direct connection state so that a motor drive torque Tm is set to a reverse-direction power assist torque Ti(Tm=Ti).

On the other hand, when the inclined traveling determination flag Fr is set to 0 (Fr=0), performed is an exclusive control {Tm being either Ti or (Tp+Tw)} in which an addition value Tp+Tw of a power assist torque Tp and a fluctuation suppression torque Tw is inputted to the motor drive part 226 as the motor drive torque Tm.

Figure 11:
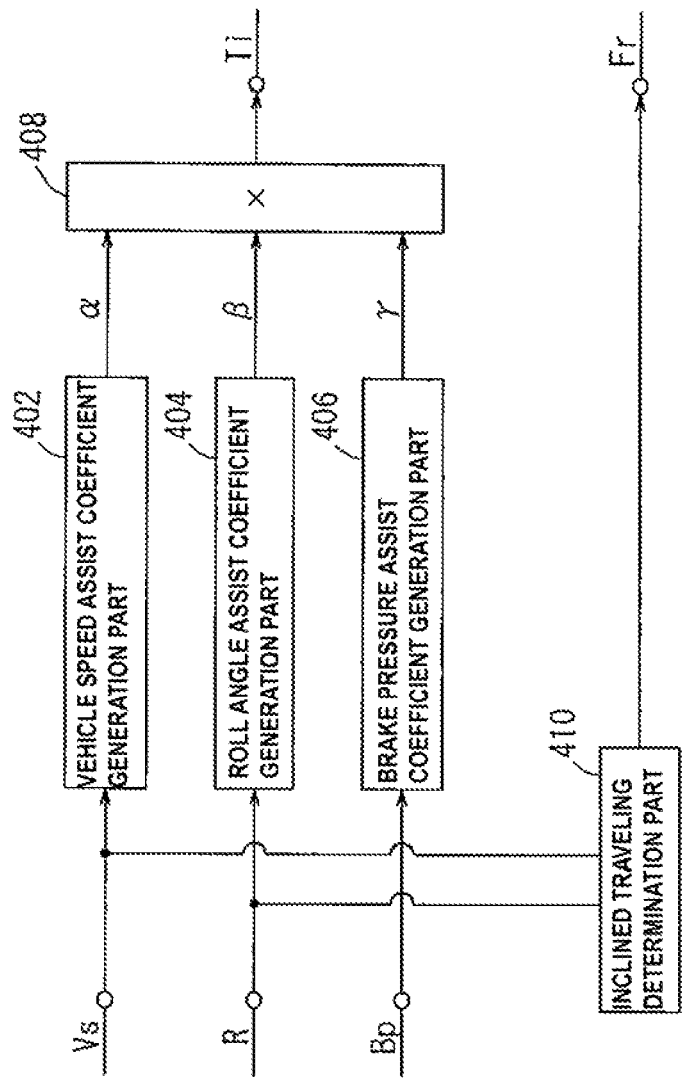
FIG. 11: A detailed view of a reverse-direction power assist torque calculation block in the total control block shown in FIG. 6.

As shown in FIG. 11, the reverse-direction power assist torque calculation block 400 can include an inclined traveling determination part 410 which determines a value of an inclined traveling determination flag Fr based on a roll angle θr based on a roll direction output R detected by the displacement detection sensor 41 which constitutes an inclination sensor and a brake pressure Bp detected by the brake pressure detection sensor 33 and outputs the value. A vehicle speed assist coefficient generation part 402 can output a vehicle speed assist coefficient α corresponding to a vehicle speed Vs detected by the vehicle speed sensor 35. A roll angle assist coefficient generation part 404 generates a roll angle assist coefficient γ corresponding to a roll angle θr. A brake pressure assist coefficient generation part 406 can generate a brake pressure assist coefficient β corresponding to a brake pressure Bp. A multiplier 408 constitutes a motor drive torque calculation part.

The multiplier 408, as expressed by formula (5), generates a reverse power assist torque Ti by multiplying the vehicle speed assist coefficient α, the roll angle assist coefficient γ and the brake pressure assist coefficient β.

$$Ti = \alpha \times \beta \times \gamma \quad (5)$$

Figure 12:
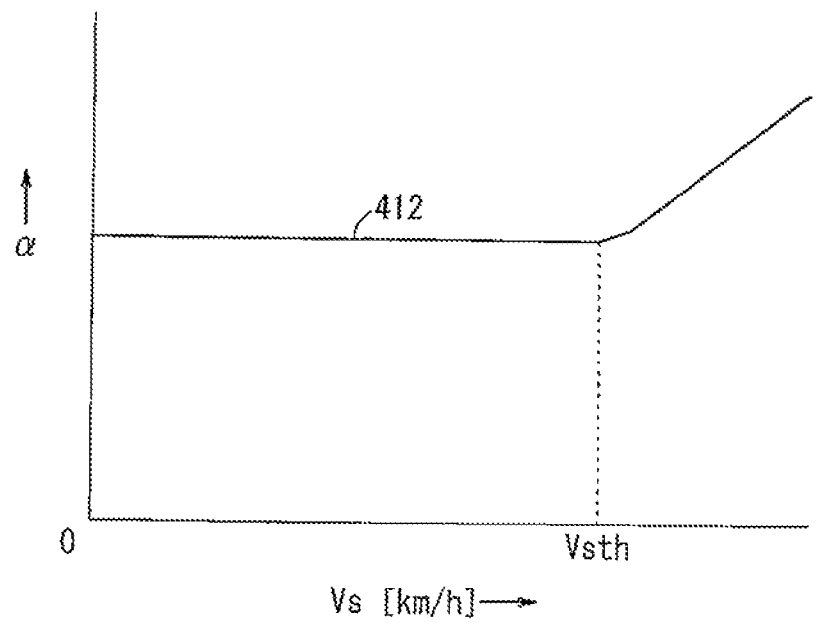
FIG. 12: An explanatory view showing a characteristic of a vehicle-speed assist coefficient served in reverse-direction power assist torque calculation process.

As shown in FIG. 12, the vehicle speed assist coefficient α is set to have a characteristic 412 where the vehicle speed assist coefficient α assumes a fixed value or a zero value when the vehicle speed Vs falls within a range from a zero value to a threshold speed Vsth and is increased proportionally with the increase of the vehicle speed Vs from the threshold speed Vsth. Here, the threshold speed Vsth is set to a value which falls between 15[km/h] and 40[km/h].

Figure 13:
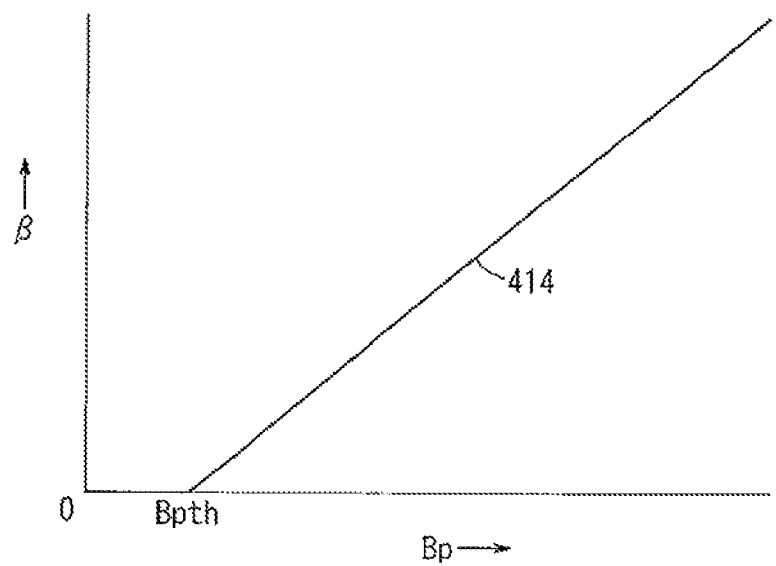
FIG. 13: An explanatory view showing a characteristic of a brake pressure assist coefficient served in the reverse-direction power assist torque calculation process.

As shown in FIG. 13, the brake pressure assist coefficient β is set to have a characteristic 414 where the brake pressure assist coefficient β is set to zero value when the brake pressure Bp falls within a range from a zero value to a threshold brake pressure Bpth and is increased proportionally with the increase of the brake pressure Bp from the threshold brake pressure Bpth. The threshold brake pressure Bpth is set to a maximum value of a dead zone or the like for preventing an erroneous operation including a play of a brake or the like.

Figure 14:
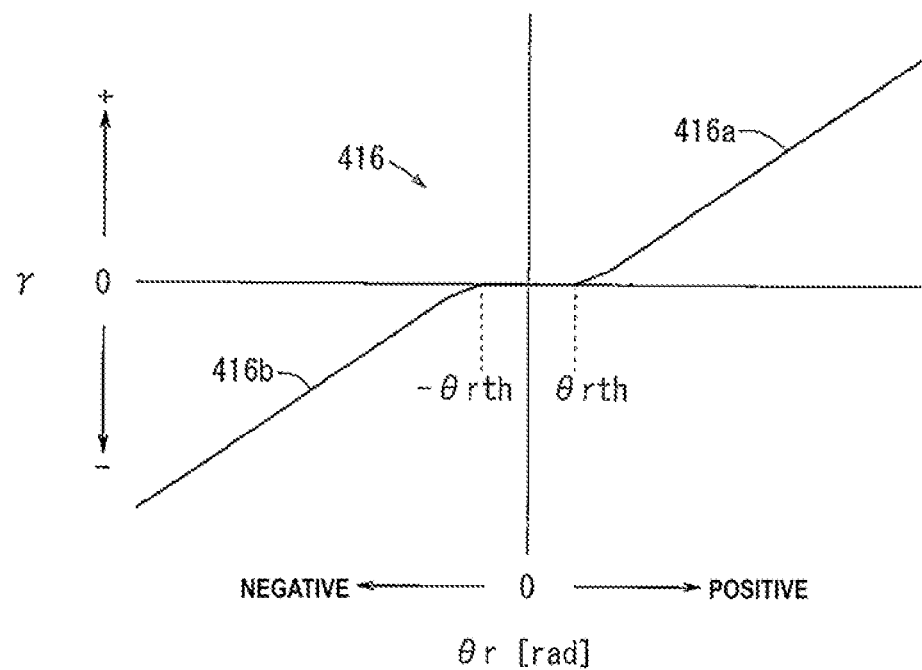
FIG. 14: An explanatory view showing a characteristic of a roll angle assist coefficient served in the reverse-direction power assist torque calculation process.

As shown in FIG. 14, the roll angle assist coefficient γ is set to have a characteristic 416 consisting of a characteristic 416a where the roll angle assist coefficient γ assumes a zero value when the roll angle θr falls within a range from a zero value to a threshold roll angle θrth in the positive direction and is increased proportionally with the increase of the roll angle θr from the threshold roll angle θrth in the positive direction, and a characteristic 416b where the roll angle assist coefficient γ assumes a zero value when the roll angle θr falls within a range from a zero value to a threshold roll angle −θrth in the negative direction (opposite direction) and is decreased proportionally with the increase of the roll angle θr from the threshold roll angle −θrth in the negative direction.

The inclined traveling determination flag Fr is set when the roll angle θr is not less than the threshold roll angle |θrth| (absolute value) (θr≥|θrth|) and the brake pressure Bp is not less than the threshold brake pressure Bpth, and the inclined traveling determination flag Fr is raised to 1 (Fr=1). The inclined traveling determination flag Fr is reset when at least one of the above-mentioned conditions {the roll angle θr being less than the roll angle |θrth| (θr<|θrth|) or the brake pressure Bp being less than the threshold brake pressure Bpth (Bp<Bpth)} is not established, and the inclined traveling determination flag Fr is put down to 0(Fr=0).

In this third embodiment, when the inclined traveling determination flag Fr is set to 1 (Fr=1), the reverse direction power assist torque Ti is applied in the direction opposite to the steering direction of the steering handle 18.

According to the above-mentioned third embodiment, when the motorcycle 10 is traveling while being inclined (turning traveling) during winding traveling or the like, for example, and a brake manipulation is detected, a steering assist force is imparted in the direction opposite to the steering direction of the steering handle 18 by the electrically-operated motor 90. Therefore, the steering assist force can resist the applying of a torque to the steering handle 18 in the turning direction due to a manipulation of a brake by a rider using a brake lever 31 or the like. Accordingly, the characteristic of turning of the motorcycle 10 when the rider performs a brake manipulation during turning while banking the vehicle body 11 can be enhanced.

The steering direction of the steering handle 18 is the direction that the vehicle body 11 rolls (inclines). Therefore, the steering direction is put into a symbol of the roll angle θr, in this embodiment, the roll angle assist coefficient γ.

Further, to determine the turning direction of the steering handle 18, a steering angle sensor which detects a rotational angle of the steering shaft 24 with respect to the head pipe 14 may be mounted.

Further, in imparting the assist force in the direction opposite to the steering direction of the steering handle 18, an assist force corresponding to a brake pressure Bp is imparted. Therefore, the assist force can be controlled linearly depending on a state of the brake thus enhancing manipulation feeling.

To be more specific, as the characteristic 414 of the brake pressure assist coefficient β shown in FIG. 13 indicates, the larger the brake pressure Bp, the larger the imparted assist force becomes. The larger the brake pressure Bp during turning, the stronger a rising force of the vehicle body 11 becomes. Therefore, by increasing the assist force applied in the direction opposite to the steering direction of the steering handle 18, the assist force can resist the rising force of the vehicle body 11.

When the brake pressure Bp is not more than the threshold brake pressure Bpth which is a predetermined pressure, the brake pressure assist coefficient β is set to 0 (β=0) thus inhibiting the imparting of the assist force. Accordingly, for example, it is possible to prevent the assist force from being applied more than necessary within a predetermined range including a play of a brake.

By changing the assist force corresponding to the roll angle θr, the assist force can be linearly controlled corresponding to a state of the changed roll angle θr and hence, manipulation feeling can be enhanced.

To be more specific, as shown in FIG. 14, the larger the roll angle θr, the larger the assist force becomes. In the motorcycle 10, the larger the roll angle θr, the stronger the rising force of the vehicle body becomes and hence, the assist force can be further increased whereby the assist force can resist the rising force of the vehicle body 11.

In this case, when the roll angle θr is not more than the threshold roll angle |θrth| which is a predetermined value, the imparting of the assist force is inhibited. Accordingly, a driver can acquire steering-unit feeling with no discomfort in a usual brake manipulation where the driver manipulates a brake with the vehicle body 11 in an upright position.

In calculating the reverse-direction power assist torque Ti, the yaw direction output Y is not used and only the roll direction output R is used. Accordingly, it is needless to say that it is sufficient to use an acceleration sensor which detects only a roll angular velocity as the displacement detection sensor 41 as an inclination sensor which detects the inclination of the motorcycle 10 in the lateral direction, or vehicle widthwise direction.

Overall Explanation of Manner of Operation of First to Third Embodiments

Figure 15:
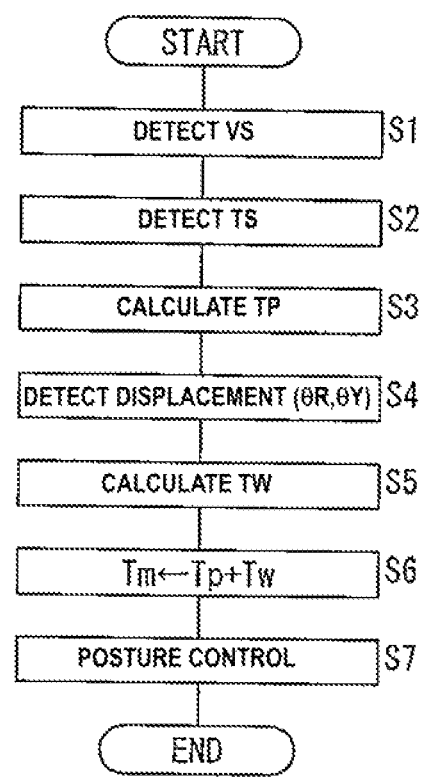
FIG. 15: A flowchart served for explaining the manner of operation of a first embodiment and a second embodiment.

Firstly, the overall manner of operation of the first and second embodiments is explained in conjunction with flowchart shown in FIG. 15.

A vehicle speed Vs is detected by the vehicle speed sensor 35 in step S1, and a steering torque Ts is detected by the steering torque sensor 112 in step S2.

In step S3, a power assist torque Tq expressed by the formula (3) is calculated by the power assist torque calculation block 200.

When a roll direction output R (roll angular velocity component) and a yaw direction output Y (yaw angular velocity component) are detected by the displacement detection sensor 41 in step S4, a fluctuation suppression torque Tw is calculated by the fluctuation suppression torque calculation block 300 based on these outputs R, Y and the vehicle speed Vs detected by the vehicle speed sensor 35 in step S5.

In step S6, as a motor drive amount (motor drive torque) Tm, an addition value (Tm←Tp+Tw) composed of a power assist torque Tp and a fluctuation suppression torque Tw is calculated by the motor drive amount control part 224, and the addition value is supplied to the motor drive part 226.

In step S7, the motor drive part 226 supplies an electric current corresponding to the torque to the electrically-operated motor 90. Therefore, a steering assist force to be added to a manipulation force (steering force) of the manipulation handle 18 by way of the electrically-operated motor 90, the transmission mechanism 86 (gear mechanism), and the steering shaft 24 is imparted to the steering handle 18.

Only a power assist torque Tp may be calculated as a motor drive amount Tm (Tm←Tp) in step S6, and a posture control in step S7 may be performed (in this case, steps S4, S5 may be omitted). Alternatively, only a fluctuation suppression torque Tw is calculated as a motor drive amount Tm (Tm←Tw) in step S6, and the posture control in step S7 may be performed (In this case, process in steps S2, S3 can be omitted).

Figure 16:
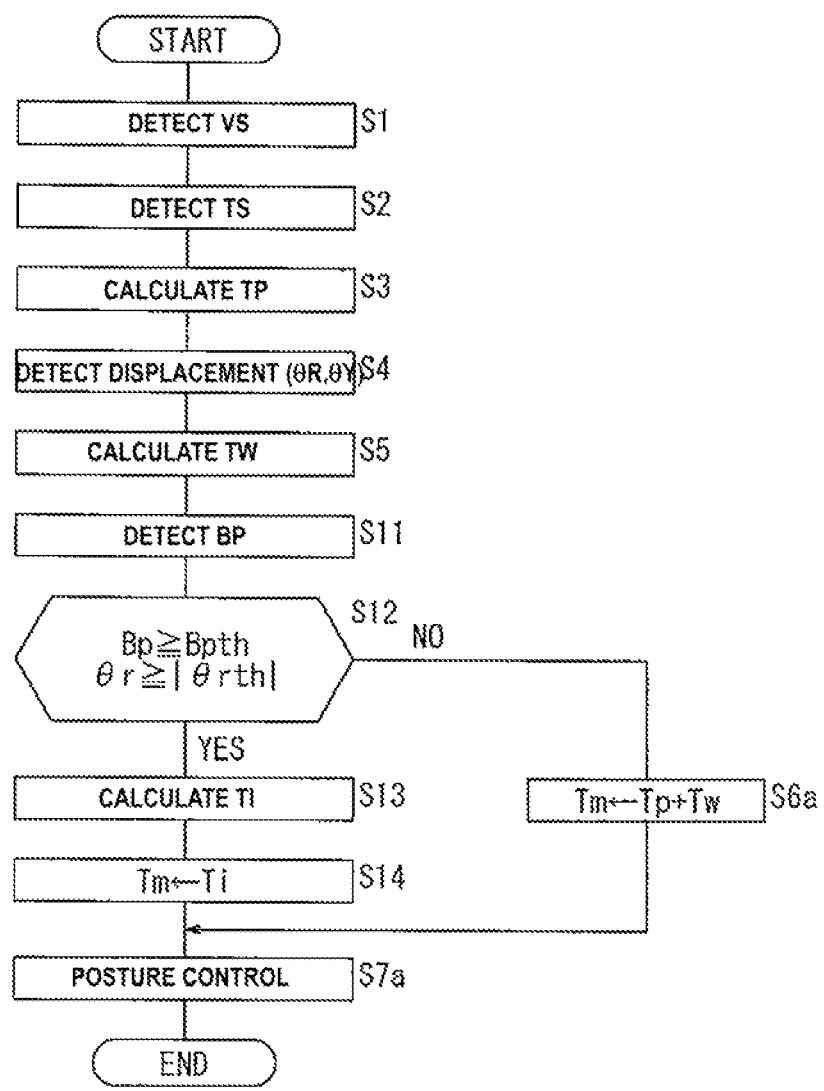
FIG. 16: A flowchart served for explaining the manner of operation of a third embodiment.

A flowchart shown in FIG. 16 is a flowchart for explaining an exclusive control performed in the first and second embodiments, and the third embodiment.

In the flowchart shown in FIG. 16, process up to step S5 is as same as the process in the flowchart shown in FIG. 15. In the flowchart shown in FIG. 16, step S6 is skipped, and a brake pressure Bp is detected by the brake pressure detection sensor 33 in step S11.

In step S12, when a brake pressure Bp is not less than a threshold value bake pressure (BpBpth) and a roll angle θr is more than an absolute value |θrth| of a threshold roll angle θrth (θr≥|θrth|), that is, when the determination made in step S12 is affirmative, in step S13, a reverse-direction power assist torque Ti is calculated by the reverse-direction power assist torque calculation block 400. In step S14, the motor drive amount Tm is set to the reverse-direction power assist torque Ti by the motor drive amount control part 224 and the electrically-operated motor 90 is driven so that an assist force in the reverse direction is added to a manipulation force (steering force) of the steering handle 18 in step S7a whereby a posture control (a control where an assist force which is a force to resist a rising force of the vehicle body 11 is applied to a steering system) is performed.

On the other hand, when the determination made in step S12 is negative, the same process as the above-mentioned process in step S6 is executed in step S6a so that an addition value of a power assist torque Tp and a fluctuation suppression torque Tw (Tm←Tp+Tw) is calculated as a motor drive amount Tm by the motor drive amount control part 224, the addition value is supplied to the motor drive part 226, and in step S7a, a steering assist force in the positive direction is imparted to the steering handle 18.

Figure 17:
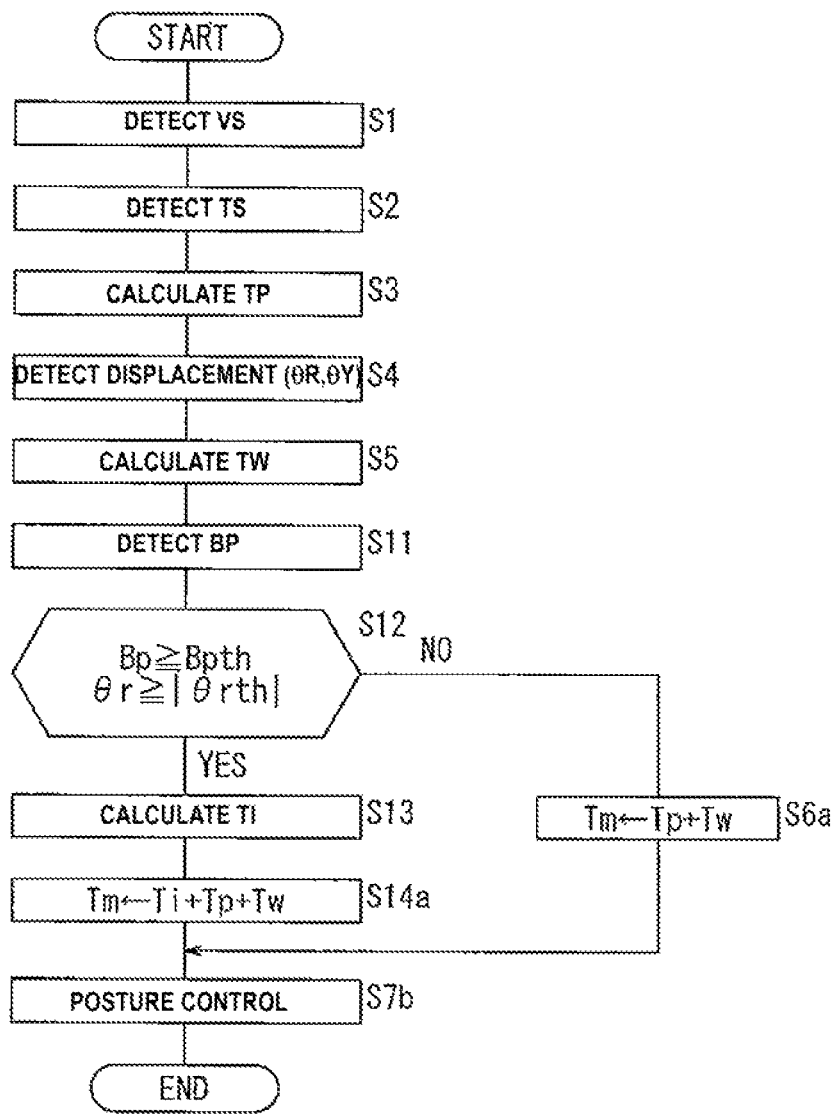
FIG. 17: A flowchart served for explaining the manner of operation of a modification of a third embodiment.

By substituting step S14a in a flowchart according to a modification shown in FIG. 17 for step S14 shown in FIG. 16, when the determination made in step S12 is affirmative, a motor drive amount Tm may be calculated as Tm←Ti+Tp+Tw. In this case, for example, by tuning (adjusting) a threshold vehicle speed Vth, a threshold roll angle θrth, and/or a threshold brake pressure Bpth such that the relationship of |Ti|>|Tp+Tw| is established, turning property can be improved using the reverse-direction power assist torque Ti.

Although the preferred embodiments of the present invention have been explained heretofore, the technical scope of the present invention is not limited to the above-mentioned embodiments. It is apparent for those who are skilled in the art that various modifications and improvements can be added to those embodiments. It is apparent that these modifications and improvements also fall within the technical scope of the present invention.

DESCRIPTION OF REFERENCE NUMERALS AND SIGNS

10: motorcycle
11: vehicle body
12: vehicle body frame
14: head pipe
16: top bridge
18: steering handle
20: bottom bridge
22: front fork
24: steering shaft
26: power assist portion
28: engine
30: exhaust muffler
31: brake lever
32: pivot shaft
33: brake pressure detection sensor
34: swing arm
35: vehicle speed sensor
36: main frame
37: rear-wheel ground contact point
38: pivot plate
39: line segment
40: seat frame
41: displacement detection sensor
42: fuel tank
44: rider's seat
46: pillion's seat
48: grab rail
50: trunk box
52, 54: step
56: vehicle body cowling
58: front cover
60: side cover
62: under cover
64: rear seat cowl
66: saddle back
68: front fender
70: rear fender
72: headlight
74: wind shield
76: side mirror
80: support and transmission member
82: base member
84: holding member
86: transmission mechanism
88: rotary drive shaft
89, 91: bolt
90: electrically-operated motor
94: support member
96: drive gear
98: idle gear
100: driven gear
102, 220, 320, 412, 414, 416, 416a, 416b: characteristic
104: actuator
105: connection arm
107: shaft
110: bearing
112: steering torque sensor
120: control unit
200: power assist torque calculation block
202, 304: gain adjuster
204: power assist vehicle speed coefficient generation part
206: correction coefficient generation part
208: adder
210, 308, 408: multiplier
212: low-path filter
214: differentiator
216: variable gain adjuster
224: motor drive amount control part
226: motor drive part
230: center-of-gravity position and weight setting part
300: fluctuation suppression torque calculation block
302: adjustment part
306: proportional vehicle speed coefficient generation part
400: reverse-direction power assist torque calculation block
402: vehicle speed assist coefficient generation part
404: roll angle assist coefficient generation part
406: brake pressure assist coefficient generation part
410: inclined traveling determination part

The invention claimed is:

1. A posture control system of a motorcycle, said posture control system comprising:
a vehicle speed sensor configured to detect a vehicle speed of the motorcycle;
a displacement detection sensor configured to detect displacement of the motorcycle in a yaw direction and displacement of the motorcycle in a roll direction, and to output a yaw direction output and a roll direction output;
an adjustment part configured to output a synthesized output by adjusting the yaw direction output and the roll direction output of the displacement detection sensor corresponding to the detected vehicle speed; and
a first actuator configured to control the posture of the motorcycle based on the synthesized output, wherein the adjustment part is also configured to output the synthesized output in which the yaw direction output is larger than the roll direction output with respect to the yaw direction output and the roll direction output when the vehicle speed is low, and the adjustment part outputs the synthesized output in which the roll direction output is larger than the yaw direction output with respect to the yaw direction output and the roll direction output when the vehicle speed is high, and wherein the posture control system thereby controls the posture of the motorcycle by detecting the posture and by controlling a steering unit based upon a detection result.

2. The posture control system of a motorcycle according to claim 1, wherein the adjustment part is also configured to generate the synthesized output as a synthesized value composed of a value obtained by multiplying the yaw direction output by a first adjustment value and a value obtained by multiplying the roll direction output by a second adjustment value.

3. The posture control system of a motorcycle according to claim 2, wherein the adjustment part is configured to set the first adjustment value such that the first adjustment value becomes large on a low speed side and small on a high speed side, and to set the second adjustment value such that the second adjustment value becomes small on a low speed side and large on a high speed side.

4. The posture control system of a motorcycle according to claim 2, wherein assuming that the yaw direction output is Y, the first adjustment value is sin ϕ, the roll direction output is R, the second adjustment value is cos ϕ, a value which ϕ takes is within 0 to π/2, a π/2 side of the ϕ is made to correspond to the lower vehicle speed and a 0 side of the ϕ is made to correspond to the high vehicle speed, and the synthesized value is S, the adjustment part is configured to calculate the synthesized value S by a following formula:

$$S = Y \times \sin \phi + R \times \cos \phi.$$

5. The posture control system of a motorcycle according to claim 1, further comprising a second actuator configured to directly change a mounting angle of the displacement detection sensor,
wherein the adjustment part is further configured to adjust the yaw direction output and the roll direction output by controlling said second actuator based on the vehicle speed.

6. The posture control system of a motorcycle according to claim 5, wherein the adjustment part is configured to adjust an initial mounting angle of the displacement detection sensor to an angle at which the yaw direction output is larger than the roll direction output in a low vehicle speed region including a vehicle speed of zero through said second actuator.

7. The posture control system of a motorcycle according to claim 1, wherein the displacement detection sensor is mounted on a line which connects a rear wheel ground contact point and a head pipe.

8. The posture control system of a motorcycle according to claim 1, wherein the first actuator comprises an electrically-operated motor, and wherein
the electrically-operated motor is configured to impart a steering assist force to a steering shaft (24), and imparts the steering assist force in an inclination direction with respect to a roll direction of the motorcycle.

9. A motorcycle, comprising:
a steering unit;
a posture control system, said posture control system comprising a vehicle speed sensor configured to detect a vehicle speed of the motorcycle,
a displacement detection sensor configured to detect displacement of the motorcycle in a yaw direction and displacement of the motorcycle in a roll direction, and to output a yaw direction output and a roll direction output,
an adjustment part configured to output a synthesized output by adjusting the yaw direction output and the roll direction output of the displacement detection sensor corresponding to the detected vehicle speed, and
a first actuator configured to control the posture of the motorcycle based on the synthesized output, wherein
the adjustment part is also configured to output the synthesized output in which the yaw direction output is larger than the roll direction output with respect to the yaw direction output and the roll direction output when the vehicle speed is low, and the adjustment part (302) outputs the synthesized output in which the roll direction output is larger than the yaw direction output with respect to the yaw direction output and the roll direction output when the vehicle speed is high, and wherein the posture control system thereby controls the posture of the motorcycle by detecting the posture and by controlling the steering unit based upon a detection result.

10. A posture control system of a motorcycle, said posture control system comprising:
vehicle speed sensor means for detecting a vehicle speed of the motorcycle;
displacement detection means for detecting a displacement of the motorcycle in a yaw direction and displacement of the motorcycle in a roll direction, and for outputting a yaw direction output and a roll direction output;
adjustment means for outputting a synthesized output by adjusting the yaw direction output and the roll direction output of the displacement detection sensor means corresponding to the detected vehicle speed; and
first actuator means for controlling the posture of the motorcycle based on the synthesized output, wherein
the adjustment means is also for outputting the synthesized output in which the yaw direction output is larger than the roll direction output with respect to the yaw direction output and the roll direction output when the vehicle speed is low, and for outputting the synthesized output in which the roll direction output is larger than the yaw direction output with respect to the yaw direction output and the roll direction output when the vehicle speed is high, and wherein the posture control system thereby controls the posture of the motorcycle by detecting the posture and by controlling the steering unit based on a detection result.

11. The posture control system according to claim 10, wherein the adjustment means is also for generating the synthesized output as a synthesized value composed of a value obtained by multiplying the yaw direction output by a first adjustment value and a value obtained by multiplying the roll direction output by a second adjustment value.

12. The posture control system according to claim 11, wherein the adjustment means is also for setting the first adjustment value such that the first adjustment value becomes large on a low speed side and small on a high speed side, and for setting the second adjustment value such that the second adjustment value becomes small on a low speed side and large on a high speed side.

13. The posture control system according to claim 11, wherein assuming that the yaw direction output is Y, the first adjustment value is sin ϕ, the roll direction output is R, the second adjustment value is cos ϕ, a value which ϕ takes is within 0 to $\pi/2$, a $\pi/2$ side of the $\phi$ is made to correspond to the lower vehicle speed and a 0 side of the $\phi$ is made to correspond to the high vehicle speed, and the synthesized value is S, the adjustment part calculates the synthesized value S by a following formula:

$$S = Y \times \sin \phi + R \times \cos \phi.$$

14. The posture control system according to claim 10, further comprising second actuator means for directly changing a mounting angle of the displacement sensor means, wherein the adjustment means is also for adjusting the yaw direction output and the roll direction output by controlling said second actuator means based on the vehicle speed.

15. The posture control system according to claim 14, wherein the adjustment means is also for adjusting an initial mounting angle of the displacement detection sensor means to an angle at which the yaw direction output is larger than the roll direction output in a low vehicle speed region including a vehicle speed of zero, through said second actuator means.

16. The posture control system according to claim 10, wherein the displacement detection sensor means comprises a sensor mounted on a line which connects a rear wheel ground contact point and a head pipe.

17. The posture control system according to claim 10, wherein the first actuator means comprises an electrically-operated motor, and wherein the electrically-operated motor is for imparting a steering assist force to a steering shaft, and for imparting the steering assist force in an inclination direction with respect to a roll direction of the motorcycle.

\* \* \* \* \*